Dec. 25, 1951     M. E. THORNTON     2,579,983
APPARATUS FOR OPERATING AUTOMATIC TELEPHONES
Filed Oct. 6, 1949     8 Sheets-Sheet 1

INVENTOR:
Michael E. Thornton

Dec. 25, 1951     M. E. THORNTON     2,579,983
APPARATUS FOR OPERATING AUTOMATIC TELEPHONES
Filed Oct. 6, 1949     8 Sheets-Sheet 2

INVENTOR:
Michael E. Thornton

Dec. 25, 1951  M. E. THORNTON  2,579,983
APPARATUS FOR OPERATING AUTOMATIC TELEPHONES
Filed Oct. 6, 1949  8 Sheets-Sheet 3

INVENTOR:
Michael E. Thornton

INVENTOR:
Michael E. Thornton

Dec. 25, 1951     M. E. THORNTON     2,579,983
APPARATUS FOR OPERATING AUTOMATIC TELEPHONES
Filed Oct. 6, 1949     8 Sheets-Sheet 7

INVENTOR:
Michael E. Thornton

Dec. 25, 1951 M. E. THORNTON 2,579,983
APPARATUS FOR OPERATING AUTOMATIC TELEPHONES
Filed Oct. 6, 1949 8 Sheets-Sheet 8

INVENTOR:
Michael E. Thornton

Patented Dec. 25, 1951

2,579,983

UNITED STATES PATENT OFFICE 2,579,983

APPARATUS FOR OPERATING AUTOMATIC TELEPHONES

Michael E. Thornton, Los Angeles, Calif.

Application October 6, 1949, Serial No. 119,927

20 Claims. (Cl. 179—90)

The invention herein described pertains to apparatus for automatically calling telephone numbers without the intervention of any human means, and more particularly to a device that will automatically call a predetermined telephone number on a standard telephone and then transmit a spoken or code message over the regular telephonic circuits in response to an external impulse, and that will accomplish such calling and transmission without any electrical connection between the said device and the said telephonic circuits.

My invention is capable of being used in a wide variety of embodiments. One of these is used in connection with a standard dial telephone and the mechanism will automatically operate the dial. Other inventors have provided devices whereby a telephone number may be automatically called by pushing buttons in proper sequence, each button accomplishing the same purpose as that achieved on the dial telephone when the operator places his finger in any given hole in the dial and rotates the dial until his finger engages the stopping bar. The following specification illustrates various applications of my invention to both types of automatic telephones.

One object of my invention is to provide simple means for adjusting the apparatus so that it will dial the particular telephone number that may be desired.

A further object is to provide a rotating device that will operate the regular telephone dial without having to reverse its direction of rotation each time the dial returns to its rest position.

Another object is to provide mechanism that will accomplish the foregoing purpose without the use of clutching devices.

Another object is to provide mechanism that will simulate many of the motions of the human finger in dialing a number.

Another object is to provide apparatus of such a nature that it will in no way injure the regular telephone equipment, and that will, in fact, produce less wear on such equipment than the dialing that is done by a human operator.

A further object is to provide means whereby the mechanism will be set in operation in response to an external impulse.

Still another object is to provide means to prevent the device from dialing the preselected number more than one time in the event that the external "triggering" impulse is continued or repeated before the device has been manually reset for another cycle of operation.

Another object is to provide means for readily ascertaining whether the circuits of the apparatus are in readiness to respond to the triggering impulse.

A further object is the provision of means for stopping the rotation of the dialing finger as soon as it has dialed the final digit of the number, regardless of how many digits such number may contain.

Yet another object is the provision of means for operating the telephone line button or lever to terminate the use of the line after the expiration of a predetermined interval following the dialing of the number.

Another object is to accomplish the foregoing objects singly or in combination with simpler and more dependable apparatus than has heretofore been available.

Another object of my broad invention is the provision of modifications in which telephone numbers may automatically be called on telephones employing push buttons instead of dials.

In the push button type of mechanism one of my objects is the provision of apparatus that will automatically actuate buttons that are disposed in the same circular arrangement at present used for the holes in a standard telephone dial.

Another object in connection with the push button modifications is the elimination of any motor excepting the motor driving the mechanism that controls the sequence of operations.

Still another object in connection with the push button forms of my invention is the provision of magnetically operated means for actuating buttons that may be arranged and disposed in any position that may be convenient for the designer.

Still another object is the provision of mechanisms in which a single solenoid is capable of actuating any number of a plurality of push buttons and in which individual solenoids are used only for selecting a push button that is to be so actuated.

Still other objects will appear as the specification proceeds.

Figure 3:
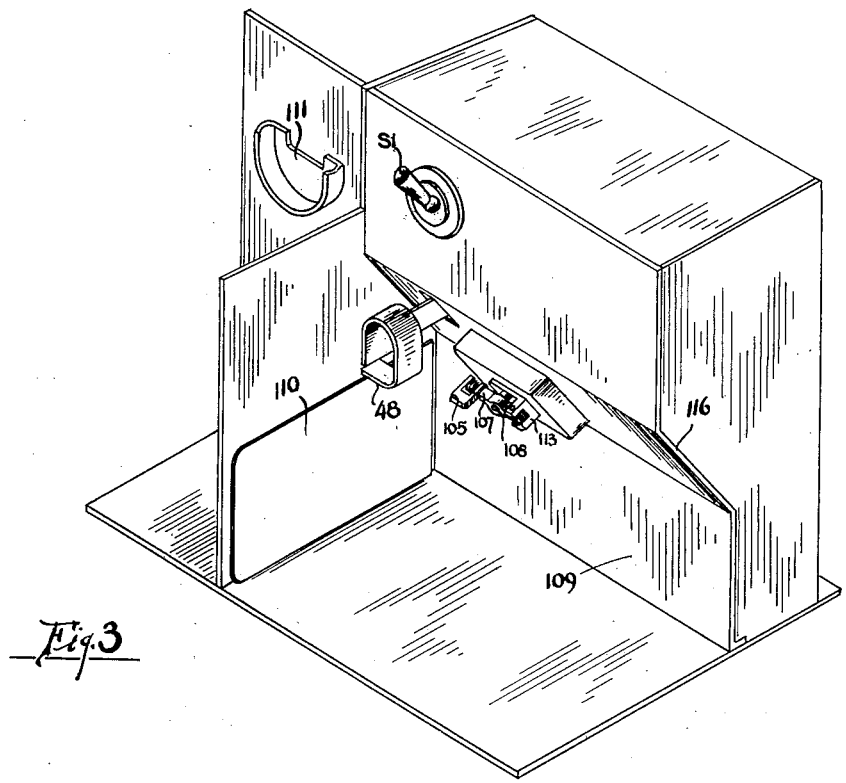

Fig. 3, on the third page of the drawings, is a modified isometric view of the housing, showing the location of the dialing finger and the lever that operates the telephone line button.

Figure 2:
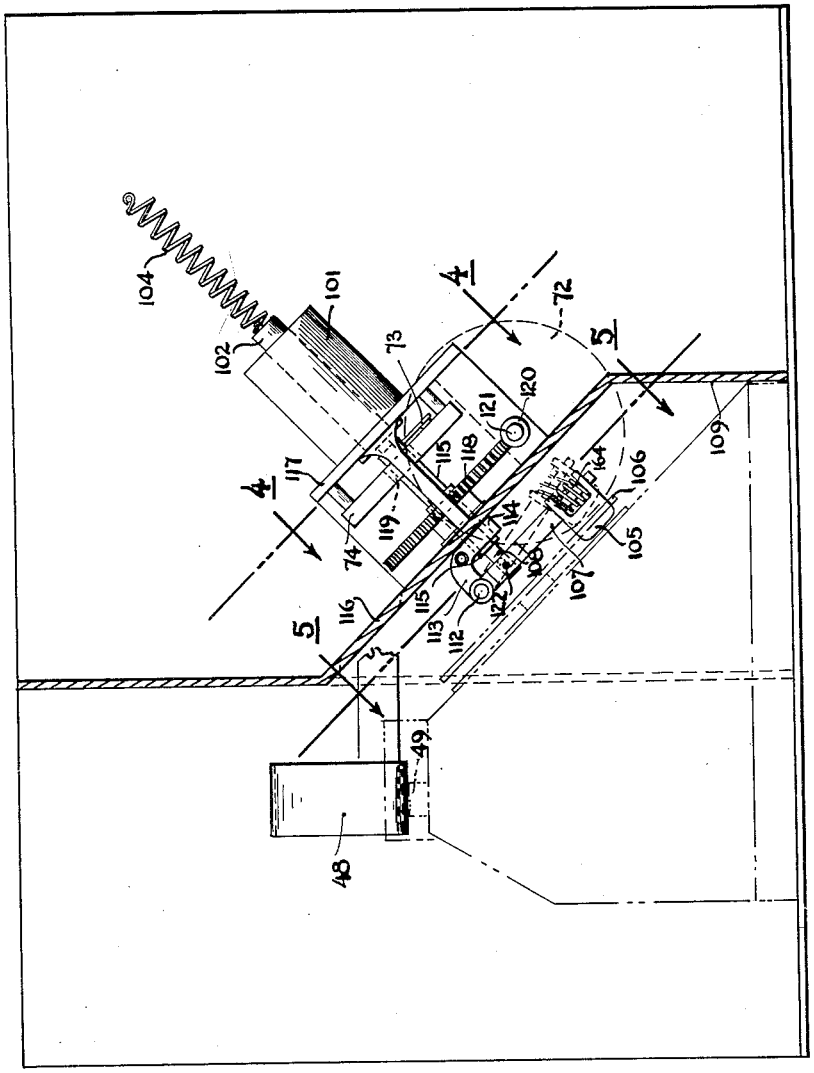
Fig. 2 is a side view of a portion of the apparatus of my preferred embodiment, showing the telephone in phantom, and the mechanical dialing finger in engagement with the telephone dial.
Figure 4:
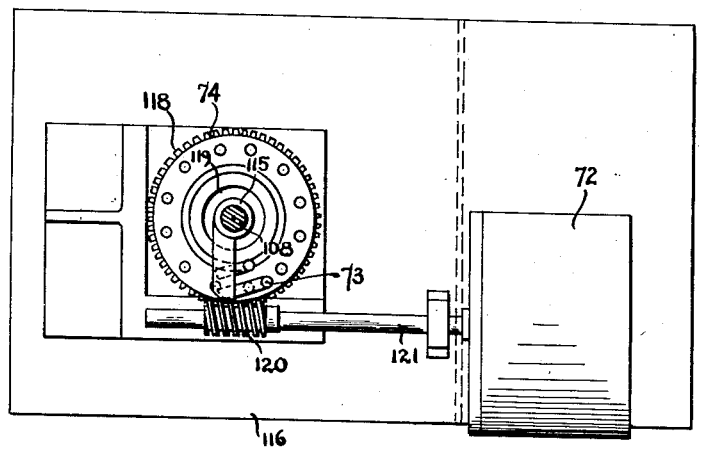

Fig. 4 is a section of the device of Fig. 2, taken along line 4—4 of Fig. 2, but oriented 90 degrees counterclockwise.

Figure 5:
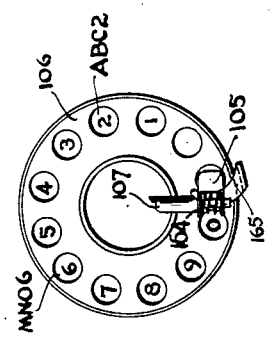

Fig. 5, on the second page of the drawings, is a section of the device of Fig. 2, taken along line 5—5 thereof, but showing the mechanical dialing finger being wiped out of one of the dial holes by the bar that normally stops the operator's finger.

Figure 6:
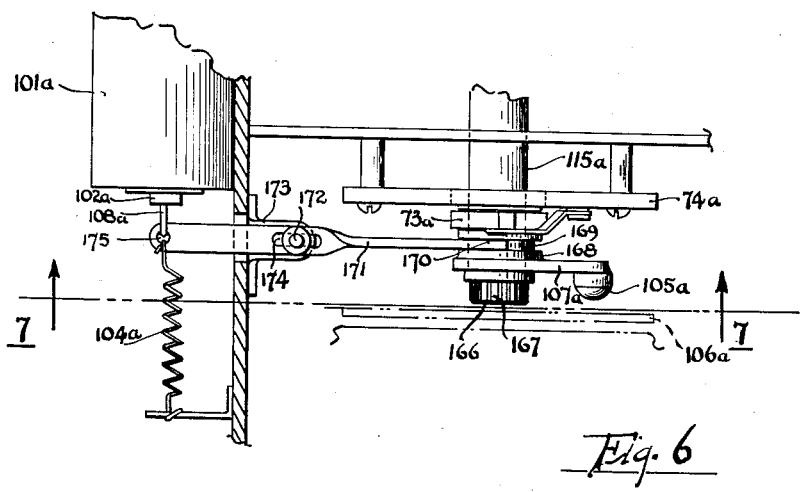

Fig. 6 shows a modification of a portion of my device, in which the operating plunger actuates the dialing finger in a manner different from that illustrated in preceding figures.

Figure 7:
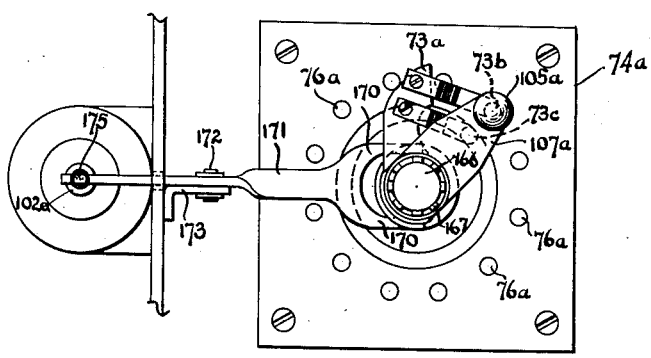

Fig. 7 is a section taken on line 7—7 of Fig. 6, showing the mechanical dialing finger, the commutator, the rotary contacts, and the relationship between the dialing finger and the rotary contacts.

Figure 8:
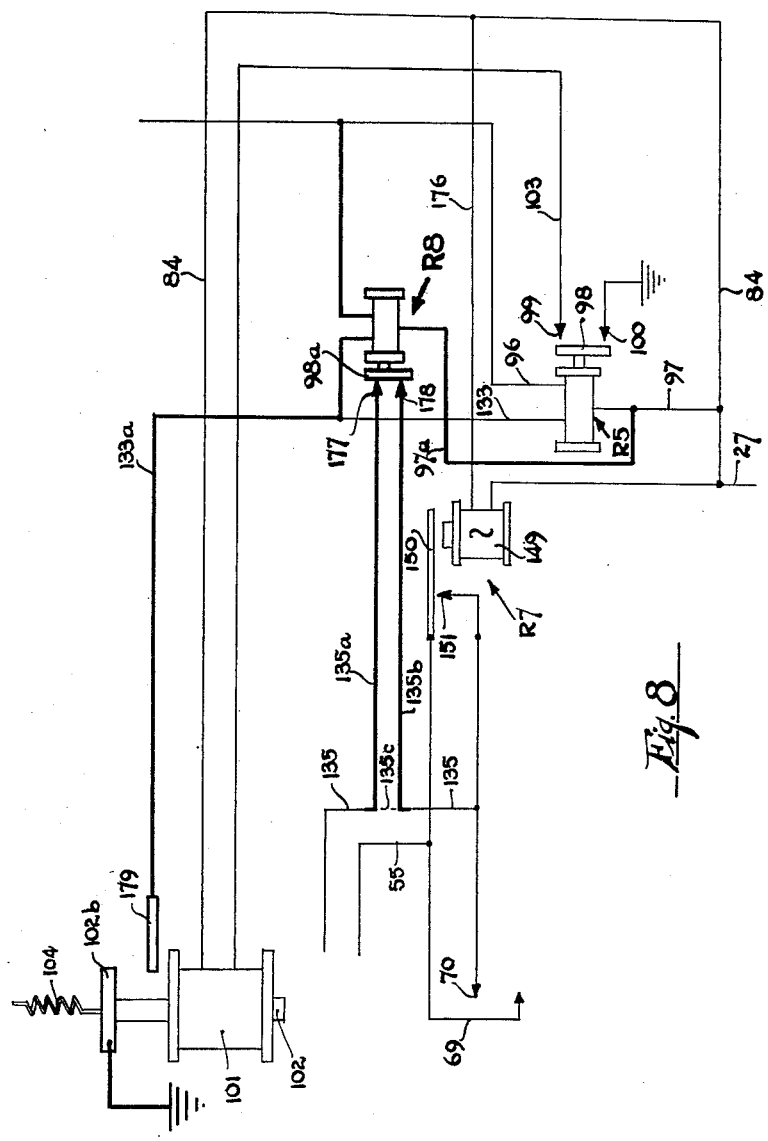

Fig. 8 is a schematic circuit diagram showing modifications that may be made in the devices of the previously described figures so that the mechanical finger will actuate push buttons instead of a dial.

Figure 9:
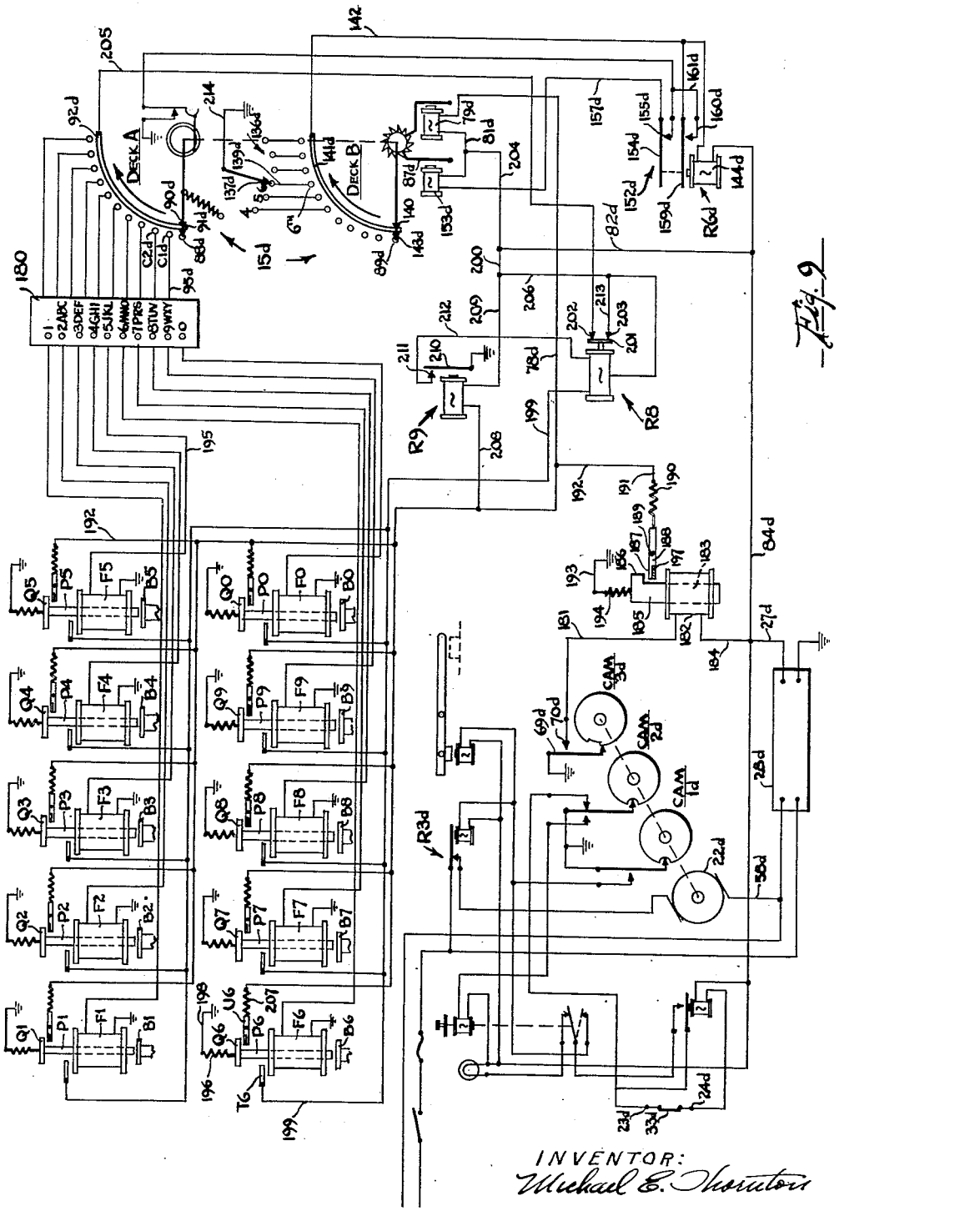

Fig. 9 is a schematic circuit diagram illustrating means whereby my invention may be used to actuate push buttons in any sequence regardless of the pattern in which the push buttons may be disposed.

Figure 10:
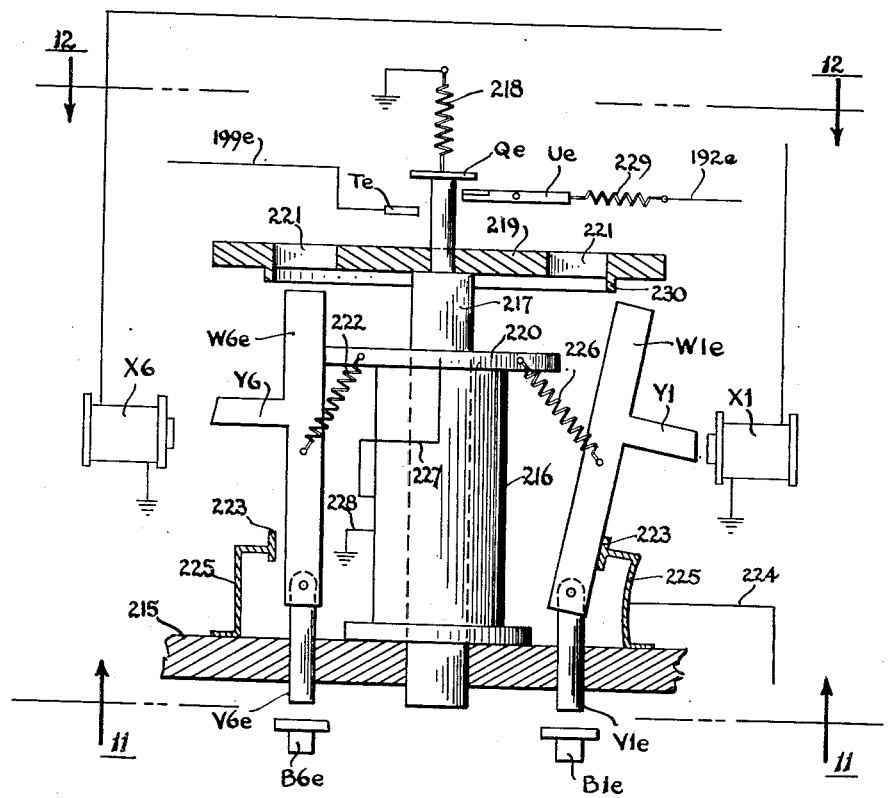

Fig. 10 is a fragmentary elevation, partly in section, showing a form of my invention in which a single solenoid will operate circularly disposed push buttons in any predetermined sequence.

Figure 11:
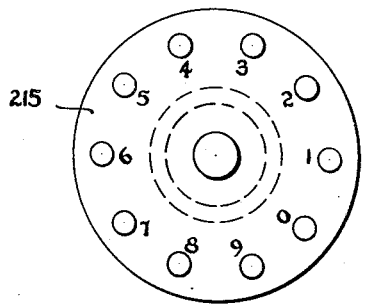

Fig. 11 is a bottom view of the device of Fig. 10 taken on lines 11—11 of Fig. 10.

Figure 12:
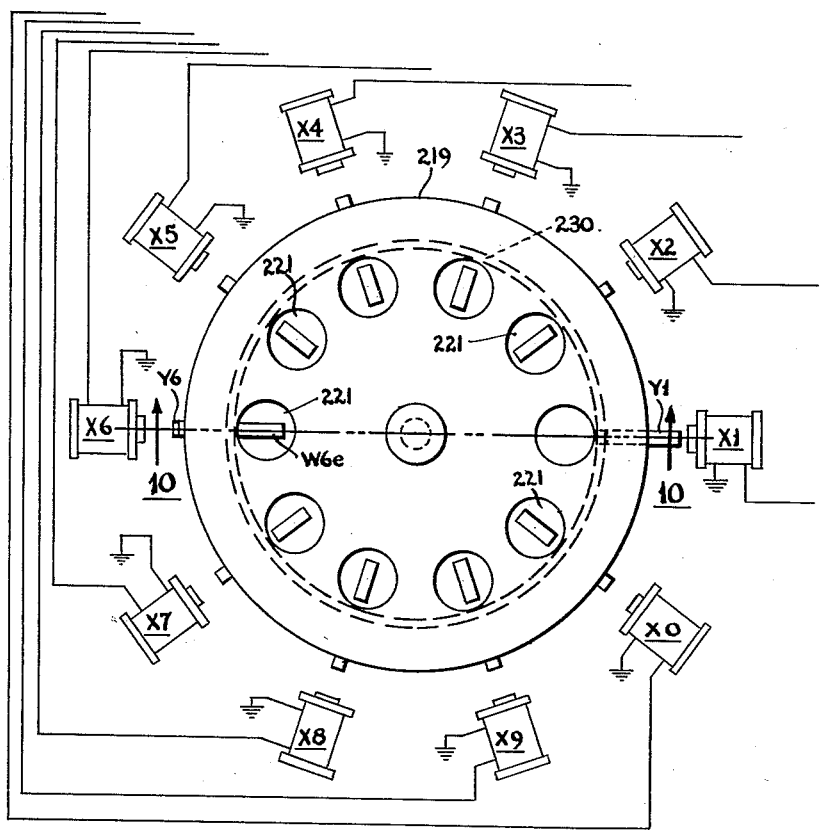

Fig. 12 is a top view of the form of my invention illustrated in Fig. 10.

Figure 13:
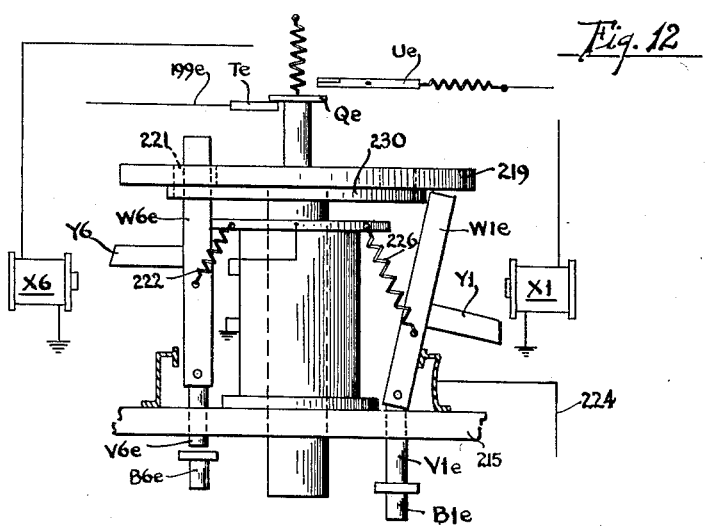

Fig. 13 shows the mechanism of Fig. 10 with the plunger of the operating solenoid in the downward position and with one push button selector in the operated position and another in the rest or inoperative position.

Figure 14:
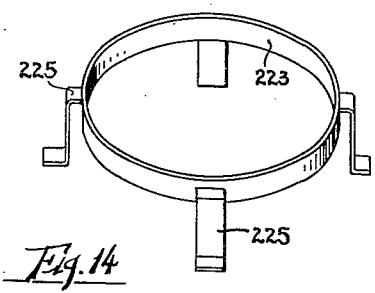

Fig. 14 is a detail of the device of Figs. 10, 11, 12 and 13, this detail being a flexible ring surrounding the selectors and operating in conjunction with the selectors to complete the circuit that energizes the main operating plunger.

The apparatus about to be described will automatically dial a preselected telephone number in response to an external impulse, hold the telephone line open for a predetermined interval to permit the automatic transmission of words or audible signals, and then "hang up" after the mechanism is through with the use of the line. All these things are accomplished without making any electrical connections whatever to the telephone, and no mechanical connection is involved excepting for the temporary use of an operating lever on the telephone line button. A mechanical finger replaces the human finger in the operation of the dial.

The mechanical finger of my apparatus must of course dial a series of letters or numbers in predetermined order, and a major part of the circuits and components of the apparatus are used for the control of this mechanical finger in its sequence of operations.

The apparatus will more readily be understood if a general idea is first obtained of the operation of the mechanical finger. In Fig. 2, the mechanical finger 105 is shown in one of the holes of the telephone dial 106, indicated in phantom. In dotted lines, this finger is shown in disengaged position. For the full duration of the dialing operation, the mechanical finger is rotating, but it descends during any given revolution only when it is exactly over the hole corresponding to the letter or number to be dialed, and it moves out of this hole when the hole comes adjacent the stopping bar that normally stops the movement of the human finger when a person is dialing a number. In order that this precision result may be obtained, it is of course necessary that the telephone be placed in the proper relationship or position with respect to the mechanical finger. This requires a concentric arrangement of the dial 106 and the shaft 108. This precise positioning of the telephone is readily obtained by placing the front of the telephone against wall 109, Figs. 2 and 3, and the left side of the instrument against wall 110, Fig. 3. The hand unit must previously have been removed from its cradle so that lever 48 may rest upon the button 49, Fig. 2, that switches the phone in and out of circuit. The hand unit then hangs from bracket 111, Fig. 3.

In order that the device may dial a preselected number, it is of course necessary that the apparatus comprise means for setting or adjusting the apparatus for such number. I prefer to accomplish this by means of the patch panel, or system of plugs and jacks, diagrammatically illustrated at 13 and 14 in the upper center of Fig. 1.

The designations 1st, 2nd, 3rd, etc. at the left of the jacks or sockets in panel 13, refer to the sequence of the letters and numbers that are to be dialed. The jacks designated in this manner are electrically connected respectively to contacts C1, C2, C3, etc. on deck A of the step switch 15.

In setting up the particular telephone number that is to be dialed, these sequentially numbered jacks in bank 13 must be connected to specific jacks in the left bank 14 according to the sequence of the letters and numbers that are to be dialed. For purposes of illustration, let us suppose that this number is Madison 6495. "M" is thus the first letter to be considered. Conductor 16, connected to jack 1st by means of plug P1, is therefore connected to one of the jacks in the 6MNO series in bank 14 by means of plug P1a. The second letter in the prefix to be dialed is the letter "A." Jack 2nd is therefore connected to one of the jacks in the 2ABC series by means of conductor 17 and its plugs P2 and P2a. The third character to be dialed is the Figure "6." Jack 3rd is accordingly connected to one of the jacks in the 6MNO series by means of plugs P3 and P3a. Jacks 4th, 5th and 6th are similarly connected to jacks in the 4GHI, 9WXY and 5JKL series respectively, as shown in the figure.

Figure 1:
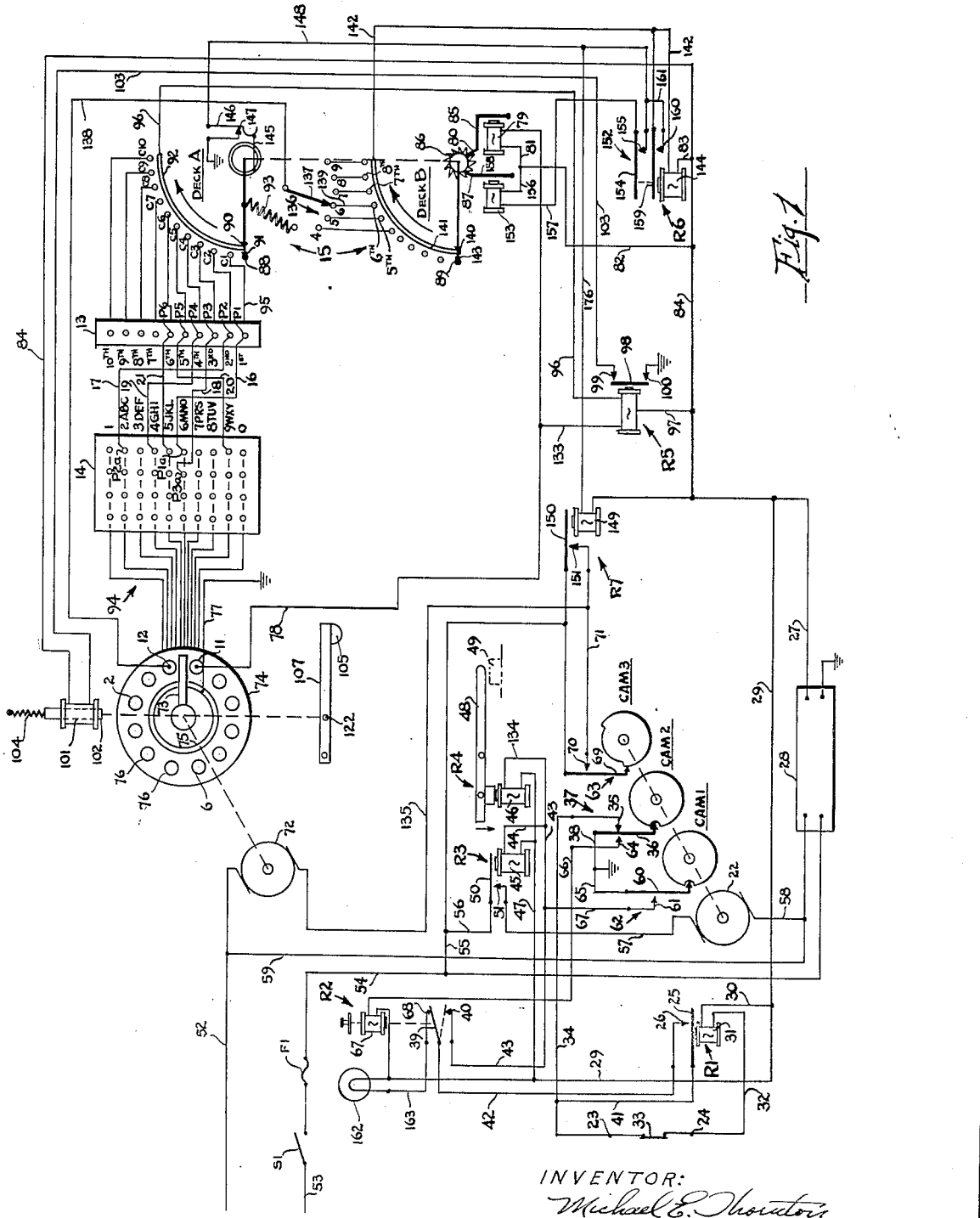
Fig. 1 is a schematic circuit diagram of my invention, in which the various components of my preferred embodiment are shown symbolically.

The sequence of the various operations performed by my device is controlled by cam 1, cam 2 and cam 3, connected for positive rotation to the sequence motor 22, as indicated diagrammatically in Fig. 1. The cams are shown in the "off" position in which they are automatically left at the end of each cycle of operation.

In the circuit arrangement which I have chosen for purposes of illustration, each cycle of operation is initiated when the circuit across terminals 23 and 24 is broken in response to an external impulse. Relay R1 is thus normally energized, holding the circuit open across arm 25 and contact 26. The circuit that closes relay R1 may be traced as follows: The current flows from power supply 28 through conductors 27, 29 and 30 to the coil 31 of relay R1, then through conductor 32 to terminal 24. When the external circuit 33 across terminals 23 and 24 is closed, as indicated, the current then flows from terminal 23 through conductor 34 to contact 35 of the jack-type single-pole double-throw switch 37, which is actuated, as indicated, by cam 2. When this cam is in the position shown, blade 36 of switch 37 engages contact 35, with the result that the current flows from blade 36 through conductor 38 to ground. Inasmuch as the opposite side of the power supply is grounded, this completes the circuit and energizes coil 31 of relay R1, thus holding arm 25 away from contact 26. As long as this relay is open, my device will not begin its cycle of operations.

If the apparatus has been properly reset for subsequent operation by manually releasing relay R2 after its last previous cycle of operations, arm 39 of this relay will be found on contact 40 whenever the opening of the external circuit 33 deenergizes the coil 31 of relay R1. When relay R1 thus releases arm 25, a circuit is completed in the following described manner through the coils of two master relays R3 and R4 that release the telephone line button and start the sequence motor. It has previously been shown that when cam 2 is in the position indicated, wire 34 is grounded through contact 35 and blade 36 of switch 37. When relay R1 is de-energized and arm 25 engages contact 26, current will flow from conductor 34 through conductor 41 and arm 25 to contact 26 and thence through conductor 42 to armature 39 of relay R2. Inasmuch as the previously mentioned re-setting operation placed arm 39 on contact 40, the current then flows through conductors 43 and 44 to coil 45 of relay R3, and from conductor 43 through conductor 134 to coil 46 of relay R4. The other side of these coils is connected to conductor 47, which in turn is connected to the power supply unit 28 through conductors 29 and 27.

The energizing of the master relays R3 and R4 in the manner just described, causes lever 48 to be lifted from the telephone line button 49, thus opening the telephone line circuit, and arm 50 of relay R3 is simultaneously brought into engagement with contact 51. The latter operation closes the circuit from the main power supply lines 52 and 53 to the sequence motor 22, it being assumed that switch S1 is in the closed position. From line 53 the current flows through switch S1, fuse F1, and conductors 54, 55 and 56 to armature 50 of relay R3, and thence through contact 51 and conductor 57 to the sequence motor 22. The other side of this motor is connected to power supply line 52 through conductors 58 and 59.

The energizing of the sequence motor 22 in response to the operation of the master relays, starts the slow rotation of cams 1, 2 and 3. These cams are of course connected to the motor through the medium of suitable reducing gears. Rotation of these cams through only a small angle results in the closing of jack switches 62 and 63, and blade 36 of jack switch 37 leaves contact 35 and engages contact 64. The grounded side of the circuit that originally operated the master relays R3 and R4 was completed through blade 36 and contact 35, as previously explained, but when blade 36 leaves contact 35, the ground connection for coils 45 and 46 of these relays is made through blade 60 and contact 61 of jack switch 62. The current then flows from ground through conductor 65, blade 60, contact 61, and conductors 67, 43 and 134 to one side of coil 46, and from conductor 67 through wires 43 and 44 to one side of coil 45. The opposite end of both of these coils is connected to the "hot" side of the power supply unit 28 through wires 47, 29 and 27. The original circuit to these coils included arm 25 and contact 26 of relay R1, but inasmuch as these parts are not in the newly completed circuit, the master relays will remain closed irrespective of the condition of relay R1, which initially started the operation of the mechanism when it released arm 25 in response to the opening of the external triggering circuit 33. The continuance of the cycle of operations is thus not dependent upon the external circuit. When blade 36 assumes its new position against contact 64, relay R2 is energized by grounding wire 66 through this contact, blade 36 and conductor 38. Wire 66, thus grounded, goes to one side of coil 67 of relay R2, and the other side of this coil is connected to the power supply 28 through wires 29 and 27. The consequent operation of relay R2 causes armature 39 to leave contact 40 and engage contact 68. Contact 40 was in the original circuit that energized the coils of the master relays, but this circuit is no longer operative, its function now having been taken over by the circuit that was closed when cam 1 moved blade 60 against contact 61. Inasmuch as relay R2 is of the manual resetting type, armature 39 remains latched against contact 68 for purposes later to be explained.

As soon as cam 3 has moved sufficiently for the spring blade 69 of switch 63 to engage contact 70, the dial motor begins to operate. The circuit thus closed may be traced as follows: From the main supply line 53, the current flows through switch S1, fuse F1, conductors 54 and 55, blade 69, contact 70 and conductors 71 and 135 to the dial motor 72; and the other side of the dial motor is connected directly to the main power supply line 52. I prefer that this dial motor be of the synchronous type and that suitable reduction gearing be interposed between the motor and the actual dialing mechanism so that the latter will rotate at about nine revolutions per minute.

As the dial motor turns, the wiper 73 of the commutator switch 74 completes a circuit between the grounded ring 75 and the particular contacts 76 that happen to be energized during a given revolution of the wiper. This ring is grounded through conductor 77. Leaving the position shown in Fig. 1, the wiper will first engage contact 11, which is connected by wire 78 to stepping magnet 79 of the stepping switch 15. The other side of this stepping magnet is connected to the power supply unit through conductors 81, 82, 84 and 27. The contacts of this stepping switch are arranged in two decks, A and B, the construction being of a conventional type available on the market. The momentary completion of a circuit by wiper 73 and contact 11 thus operates the stepping magnet 79, attracting armature 85 and causing dog 80 to advance the ratchet wheel 86 by an angular distance of one tooth, thus moving the rotary contacts 88 and 89 to the first stationary contacts of decks A and B respectively. This places rotary contact 88 on stationary contact C1, and rotary contact 89 on the conducting segment 92. Pawl 87 holds the ratchet wheel in this position against the action of the loading spring 93. When the rotary contacts are in this position, an electrical connection is made from contact C1 to segment 92 through conductor 91. This closes a portion of a circuit that is ultimately completed when wiper 73 reaches the particular contact on the commutator that has been electrically connected through the patch panel to contact 1st of the stepping switch.

It should here be stated that each of the ten groups of jacks (1, 2ABC, 3DEF, etc.) are connected respectively to the corresponding contact (1, 2, 3, etc. respectively) on the commutator by means of one of the wires in group 94. The actual connections to the commutator contacts have been omitted in the schematic drawing for the sake of greater clarity and simplicity.

Inasmuch as only one of the contacts from 1 to 9 and 0 on the commutator are electrically connected to any given contact of the C1, C2, C3 series on deck A of the stepping switch, only one of the said ten contacts of the commutator is "hot" during any given revolution of the wiper arm 73.

The number to be dialed was Madison 6495, and jack 1st in the bank of jacks 13 was accordingly connected to one of the jacks 6MNO in bank 14 by means of conductor 16 and the plugs on opposite ends thereof.

Because of the circuit arrangements hereinbefore described, no circuit will be completed after wiper 73 leaves contact 11 until the wiper reaches the "hot" contact 6. The circuit then completed will be as follows: From grounded wire 77, the current passes through ring 75, wiper 73, contact 6 and one of the wires in group 94 to the jack in which plug P1a is inserted. From plug P1a the current passes through conductor 16, plug P1, jack 1st, conductor 95, contact C1, brush 88, conductor 91, brush 90, segment 92, and conductor 96 to the right side latching relay R5. The other side of this relay is connected to the power supply through conductors 97, 84 and 27. The momentary engagement of wiper 73 with contact 6, thus energized the latching relay R5 so as to bring bar 98 against contacts 99 and 100. This completes a circuit from ground through contact 100, bar 98, contact 99, conductor 103, and thence through solenoid 101, and conductors 84 and 27 to the power supply. The resultant energizing of solenoid 101 pulls plunger 102 downward against the action of the keeper spring 104. The latching relay maintains this circuit connection until released by means later to be described, and the plunger consequently remains depressed until such release is effected.

The function of plunger 102 is to move the mechanical dialing finger 105 into a dial hole or opening against the action of the keeper spring 104. The operation of these mechanical parts will more readily be understood by referring to Fig. 2. The mechanical finger 105 is mounted on an arm 107, which is pivoted at 112 of an extension 113 of a collar 114 rigidly mounted on sleeve 115. This sleeve is journaled in plates 116 and 74. A worm gear 118 is rigidly mounted on this sleeve just above plate 116, and the hub of the worm gear and collar 114 restrain the sleeve against longitudinal movement. The integral brush structure 73 is also rigidly mounted on sleeve 115, which passes through an opening 119 in the stationary commutator 74. A worm 120 meshes with worm gear 118. This worm is rigidly attached to shaft 121 of motor 72, Figs. 1 and 4. By virtue of these positive connections, all the members mounted on sleeve 115 turn as a unit whenever the motor 72 is running. The contacts 1 to 9 and 0 on the commutator have the same angular spacing as the corresponding holes in the telephone dial, Fig. 5, and the brush structure 73, Figs. 1, 2 and 4, and the mechanical finger are so positioned on sleeve 115 that when brush 73 is passing over any given contact, the mechanical finger will be directly over the corresponding hole in the dial. The upper end of shaft 108 is operatively connected to plunger 102, and the lower end is pivoted at 122 to the arm 107 that carries the mechanical finger.

When wiper or brush 73 passes over contact 6, as explained in the second preceding paragraph, the mechanical finger will be exactly over hole MNO6 in the dial. The downward movement of the plunger in response to the completion of the circuit by wiper 73 and contact 6, Fig. 1, consequently moves shaft 108, Fig. 2, downward, pressing finger 105 into hole 6. Inasmuch as the finger is constantly revolving, it will rotate the dial with it until the plunger is de-energized. Such de-energizing takes place when wiper 73 passes over contact 11, Fig. 1. It has previously been explained that engagement with this contact grounds conductor 78. This conductor is connected to the side of the latching relay R5 that unlatches bar 98, thus opening the circuit across contacts 99 and 100. This opens the previously traced circuit to solenoid 101, and its consequent de-energizing releases the plunger 102, permitting spring 104 to pull up on the plunger and the connected shaft 108, which then pulls finger 105 out of the dial hole. The dial then returns to its normal position in its customary manner.

It was previously explained that the completion of a circuit with contact 11 also operates the stepping magnet 79 of stepping switch 15. This causes the rotating contact 88 to advance to the next stationary contact C2 of the stepping switch. By virtue of the connections set up on the patch panel, this completes a circuit as far as contact 2 of the commutator 74. When wiper 73 reaches this contact, a circuit will again be completed to the right side of the latching relay—this time at the exact instant that the mechanical finger is over hole ABC2 in the dial. Bar 98 then closes the circuit to the solenoid 101, and the parts connected to the plunger are again pulled down, forcing the mechanical finger this time into the proper hole to dial the "A" in Madison. The finger will withdraw when wiper 73 again reaches contact 11. This will advance the rotating contact 88 of the stepping switch to another stationary contact on the stepping switch, thus completing a circuit to another of the commutator contacts so that the next sweep of wiper 73 will cause the dialing of the next number in sequence. This procedure continues until the selected number has been completely dialed.

After the mechanical finger has thus dialed the completed number, further rotation of the finger and the rotary contact 73 is not required. The apparatus accordingly embodies means whereby the motor 72 is de-energized after the finger has made as many revolutions as there are letters and digits in the number to be dialed. Inasmuch as the number of digits is variable, I prefer that the motor circuit be broken by some other means than cam 3 which originally closed the circuit. It will be remembered that the dial motor was initially started when cam 3 turned sufficiently for blade 69 of knife switch 63 to slip off the portion of the cam having the larger radius, this blade then coming into engagement with contact 70. If this cam were also to be used for breaking the motor circuit, the break would occur as soon as the portion of the cam having the reduced radius had passed the tip of blade 69. Inasmuch as the cam rotates at a fixed speed, the dial motor would always operate for a fixed period of time if this cam were to control the stopping as well as the starting of the motor. In order that the motor may be de-energized automatically as soon as the last digit in the number has been dialed, my device comprises means whereby the apparatus may be adjusted so that the motor will stop after performing the exact number of dialing operations required for the specific telephone number to be dialed. Control of the motor circuit must accordingly be taken away from cam 3 as soon as the stepping switch starts to operate. This is done in the following described manner. When the ratchet wheel 86 of the stepping switch has turned sufficiently for arm 145 to move away from the cam-shaped portion of leaf spring 146, this leaf moves against contact 147. This completes a circuit from ground through contact 147, leaf 146 and wires 148 and 176 to coil 149 of relay R7. This circuit remains closed as long as rotary contact 89 is in engagement with any of the stationary contacts of deck A of the stepping switch. The energizing of coil 149 of relay R7, causes armature 150 of this relay to be drawn into engagement with contact 151, thus forming another electrical path to the motor in parallel with the path across switch 83. The motor will accordingly operate as long as current flows through coil 149 of this relay.

The time when this coil will be de-energized is adjustably controlled by means of the selector switch 136. If there are only four letters and/or numbers to be dialed, the rotary contact 137 of this switch is placed on stationary contact 4 of selector switch 136, but if there are six letters and numbers to be dialed, as in the number that we have chosen for purposes of illustration, then the rotary contact 137 is placed on stationary contact 6. These stationary contacts of this selector switch are electrically connected to the stationary contacts of deck B of the step-switch 15, each of the selector switch contacts being connected to the contact on deck B that has the next highest number; that is, selector switch contact 4 is connected to contact 5th on deck B, and selector switch contact 5 is connected to contact 6th on deck B, etc. The last digit in Madison 6495 was dialed while the rotary contacts of the step switch were on the 6th stationary contacts of the respective decks; but when the wiping contact 73 of the commutator 74 again sweeps over commutator contact 11, the resulting electrical impulse over the circuit thus closed will cause the stepping magnet 79 to advance the movable contacts of the stepping switch to the 7th stationary contacts of the respective decks. When the number to be dialed was set up on the patch panels, no connections were provided for jacks 7th, 8th, 9th and 10th of panel 13, and as a consequence, no circuit is completed upon the engagement of rotary contact 89 with contact C7. Deck B, however, now comes into play. The 7th contact on deck B is connected to contact 6 of selector switch 136, and it was upon this contact 6 that rotary contact 137 was placed because there were six numbers and digits in the number to be dialed. Rotary contact 137 is connected by wire 138 to stationary contact 12 of commutator 74. On previous revolutions of wiper 73 over the commutator, contact 12 was not energized, but on this seventh revolution a circuit is completed from grounded ring 75 through wiper 73 to contact 12, and thence through conductor 138, rotary contact 137, contact 6, conductor 139, stationary contact 7th of deck B, rotary contact 89, conductor 143, rotary contact 140, segment 141 and conductor 142 to coil 144 of relay R6. The other side of coil 144 is connected to the high potential side of the current supply by means of conductors 83, 84 and 27.

When relay R6 is thus energized, the double-pole, single-throw switch 152 moves to the closed position. In the closed position, blade 154 is in engagement with contact 155, completing a circuit through the release magnet 153 of the step switch. It has previously been mentioned that conductor 82 is connected to the high potential side of the power supply unit 28 through conductors 27 and 84. Conductor 82 is connected to one side of the release magnet 153 through conductor 156. The other side of the release magnet is grounded through switch 152 as soon as the coil 144 of relay R6 is energized. When this relay operates, current flows from coil 153 through conductor 157, blade 154 and contact 155 of switch 152, and then through conductor 143, balde 146 and contact 147 to ground. The consequent energizing of coil 153 causes the release magnet to attract armature 158, to which pawl 87 is attached. When this pawl is thus pulled away from the ratchet wheel 86, the rotary parts of the stepping switch are pulled toward the rest position by the return spring 88. In order to prevent relay R6 from being de-energized as soon as the rotary contact 89 leaves the seventh contact of deck B under action of return spring 88, additional contacts are closed by relay R6 so that coil 144 of this relay will remain energized until the step switch has returned all the way to the rest position. This is accomplished by the engagement of blade 159 with contact 160. Coil 144 of relay R6 is then grounded through wire 162, blade 159, contact 160, conductor 161, wire 148, blade 146 and contact 147. Inasmuch as blade 146 does not leave contact 147 until the rotary contacts of the stepping switch have returned all the way to their rest position, coil 144 remains energized for this same period, and the circuit to the release magnet 153 consequently remains closed and holds pawl 87 away from the ratchet wheel 86 until arm 145 of the stepping switch again engages blade 146 and breaks the circuit to coil 144 of relay R6 as well as to coil 149 of relay R7. The de-energizing of relay R7 opens the circuit to the dial motor 72 through armature 150 and contact 151, and the de-energizing of relay R6 opens the circuit to the release magnet 153, permitting pawl 87 to re-engage the ratchet wheel 86 after the stepping switch has returned to its rest position.

The breaking of the circuit to the dial motor in no way affects the sequence motor 22, which continues to operate until cams 1 and 2 have made a complete revolution to the position shown in Fig. 1, thus breaking the circuits to relays R2, R3 and R4. In the meantime, lever 42 remains away from the telephone line button 40, and the telephone line remains open. During the interval between the dialing of the number and the closing of the master relays, the telephone line may be used for the transmission of audible signals through the regular telephone transmitter. The hand set may be hung during this interval on hook 111, Fig. 3. In one embodiment of my invention, a buzzer is located in proximity to hook 111 so that the sound of the buzzer may be picked up by the transmitter, and provision is made for the buzzer automatically to emit code signals that indicate the nature of the disturbance that caused the external circuit to open across contacts 23 and 24, Fig. 1. This adaptation or use of my device is not further explained, because the present application is confined to my number-calling mechanism and the associated apparatus that causes this mechanism to operate when the external circuit is broken.

When the external end of blade 60 of switch 62 falls into the recess in cam 1 upon completion of the revolution that returns this cam to the position shown in Fig. 1, blade 60 leaves contact 61, thus opening the circuit to relays R3 and R4. Armature 50 of relay R3 then leaves contact 51, opening the circuit to the sequence motor 22. The de-energizing of relay R4 causes lever 48 again to rest on the telephone line button 49, thus closing the telephone circuit.

Cam 2 will then be in the position shown in Fig. 1, and the ground circuit to relay R2 will thus be broken through blade 36 and contact 64. The de-energizing of coil 67 of relay R2 does not permit the return of armature 39 from contact 68, however, because this relay must be manually reset. When the energizing of relay R2 was originally discussed, it was stated that the reason for the latching of armature 39 against contact 68 would later be explained. As long as armature 39 remains away from contact 40, it is impossible for the apparatus to begin a second cycle of operations in response to the opening of the external circuit 33, because even though the external circuit may leave relay R1 de-energized and thus permit its armature 25 to remain against contact 26, the circuit that initially operates the master relays R3 and R4 cannot be completed as long as armature 39 of the reset relay remains away from contact 40. If the apparatus has been used to dial a number so that an alarm may be transmitted to the station dialed, the person or persons responding to such alarm are likely to find the exterenal circuit still open. If all other circuits and parts of the apparatus are in such condition that the external circuit may safely be restored to permit the subsequent operation of the device in response to another interruption of the external circuit, the ready light 162 will glow. Voltage will be applied to one side of this lamp from the power supply unit 28 through conductors 27 and 29; and the other side of the lamp will be grounded through conductor 163, contact 68, armature 39, conductor 42, contact 26, armature 25, conductors 41 and 34, contact 35, blade 36 and conductor 38. When the external circuit is closed, relay R1 will return to its normal operated position hereinbefore discussed. This holds armature 25 away from contact 26, and the circuit to the ready light is thereby broken. The manual resetting of the manual re-set relay R2 places armature 39 against contact 40, and the whole apparatus is then again in condition to begin its cycle of operations in response to the interruption of the external circuit.

I prefer that the mechanical dialing finger 105, Figs. 2, 3 and 5, be rotatably mounted on the lever 107, and that it be spring-loaded, as by a spring 164, to a position at right angles to the telephone dial 106. This spring-loaded construction is a precaution against the possibility that the mechanical finger might strike the stopping bar 165, Fig. 5, instead of moving completely out of the dial hole immediately at the end of its stroke. If the dial finger were rigidly mounted, its accidental engagement with the stopping bar might injure either the finger or the bar, or might result in jamming. But with the spring loaded construction this cannot occur, because if the finger engages the stopping bar before it has completely withdrawn from the dial hole, the stopping bar will merely cause the finger to wipe out of the hole and over the stopping bar, as shown in Fig. 5.

In Figs. 6 and 7, I have shown a modified construction of the dialing finger, actuating lever and commutator. Shaft 115a corresponds to sleeve 115 in my preferred embodiment shown in Fig. 2, and it is rotated in the same manner as sleeve 115. The lower end 166 of shaft 115 is provided with external splines 167, as shown in Figs. 6 and 7. Surrounding this externally splined section, I provide an internally splined sleeve 168, its internal splines meshing with the external splines of the shaft. The sleeve is thus free to move longitudinally with respect to the shaft, but there can be no relative angular movement between the shaft and sleeve. This sleeve is integral with the finger arm 107a, which carries the mechanical finger 105a. Arm 107a and finger 105a correspond respectively to arm 107 and finger 105 of the previously described preferred embodiment. Sleeve 168 has a circumferential groove 169 to receive the tines 170 of the forked end of lever 171. A stub shaft 172, rigidly mounted in a bracket 173, passes through a longitudinal slot 174 in lever 171, and the lever is free to slide as well as to rotate on the stub shaft. The non-forked end of lever 171 is pivoted at 175 to extension 108a of plunger 102a, this plunger performing the same function as plunger 102 of the previously described embodiment. Solenoid 101a is actuated in the same manner as solenoid 101, but it draws upward, instead of downward, on its plunger 102a. When plunger 102a is thus drawn into the solenoid, the extension 108a pulls up on the left end of lever 171 against the action of the keeper spring 104a, and the tined end of the lever moves sleeve 168 in the direction of dial 106a (shown in phantom). Finger 105a, attached to sleeve 168 by the integral arm 107a, is accordingly lowered into the aligned opening in the dial.

In order to make certain of such alignment, the contacts 76a, Fig. 7, of the commutator 74a have the same angular spacing as the dial holes, as was the case with the corresponding commutator contacts of the previously described embodiment; and the rotary contacts 73b and 73c, carried by contact arm 73a, are angularly aligned with the dial finger 105a, as shown in Fig. 7. The contact arm 73a is of course rigidly mounted on shaft 115a. It will be noted that the stationary contacts 76a are here arranged on the under side of the commutator base, instead of on the top as in the form previously described; but in either embodiment the contacts could be arranged on either side.

Various experimenters have proposed push button arrangements whereby telephone numbers may be called by pressing the buttons in proper sequence. Such buttons correspond respectively to the openings in the conventional dial, and the operation of any button causes the same impulses to be transmitted over the telephone line that are transmitted when the user of a dial telephone places his finger in the corresponding dial hole and rotates the dial until his finger strikes the stop bar. If such buttons are arranged in a circle so that they occupy the same positions as the corresponding holes in the conventional dial, it is necessary to make only slight changes in my dialing mechanism as hereinbefore described in order to use the mechanism for the actuation of such buttons. Fig. 8 is a schematic illustration of the changes that may be made in the system of Fig. 1 so that my mechanism will operate such push buttons automatically.

The heavy lines in Fig. 8 illustrate new parts and electrical connections that are specific to the push button modification, while the light lines show the conductors and components of Fig. 1 with which the altered circuits are connected. In the embodiments previously described, the mechanical finger rotates continuously during the number-calling process, and there is no cessation of this rotation while the finger is being lowered or raised. When push buttons are used, however, the rotation must cease when any button is to be pressed, and the rotation must not be resumed until such operated button has returned to its raised or rest position. When the mechanism hereinbefore described is to be modified to operate a push button telephone, I accordingly provide means for stopping the rotation of the mechanical finger 105, Fig. 1, whenever the rotary contact 73, Fig. 1, engages one of the stationary contacts 76 that has been energized by the circuits set up on the patch panels 13 and 14. As previously explained, a circuit completed through the patch panels includes the conductor 96 and the right coil of relay R5. The explanation of Fig. 1 showed that the energizing of this coil brings the armature 98 of this relay into engagement with contacts 99 and 100, thereby completing a circuit through solenoid 101 that lowers the mechanical finger 105 against the action of the keeper spring 104. In my push button adaptation of this mechanism, another latching relay R8 is connected in parallel with latching relay R5, and the armature 98a of relay R8 rests against contacts 177 and 178 when the left coil of this relay is energized. These contacts 177 and 178 are placed in series with conductor 135 which energizes the dial motor 72. Fig. 8 shows in a dotted line at 135c the continuity that wire 135 takes in the circuits of Fig. 1, but in the Fig. 8 modification wire 135 is broken on opposite sides of the 135c portion, and the upper part of wire 135 continues to the right as wire 135a, which connects to contact 177. Contact 178 is connected to conductor 135b which joins the lower part of wire 135. In the push button arrangement, the circuit to the motor through conductor 135 is thus complete as long as bar 98a remains on contacts 177 and 178, but whenever the rotary contact 73, Fig. 1, strikes a stationary commutator contact that has been energized through the patch panels, the consequent energizing of the right coil of relay R8 causes bar 98a to move to the right, thus breaking the circuit across contacts 177 and 178, Fig. 8. These contacts are in the dial motor circuit, and the motor consequently stops when bar 98a moves to the right. When bar 98a of relay R5 strikes contacts 99 and 100, solenoid 101 is energized as explained in connection with Fig. 1 and the plunger 102 lowers the mechanical finger. Inasmuch as the finger is no longer rotating, it merely presses down on the push button that takes the place of the dial hole in this modification. As soon as the top 102b of plunger 102, Fig. 8, reaches its bottom position and strikes contact 179, a circuit is completed through the left sides of the latching relays. In the Fig. 8 modification, the top 102b of plunger 102 is grounded as shown, and when top 102b strikes contact 179, the current flows from ground through conductors 133a, 133 and the left coils of relays R5 and R8 which are connected to conductors 97a, 97 and 94, the latter leading to the power supply as explained in connection with the previously described embodiments. The energizing of the left coil of latching relay R8 brings bar 98a back against contacts 177 and 178, thus restoring the circuit to the dial motor. The mechanical finger then resumes its rotation and the operation is the same as in the previously described embodiments until the rotary contact 73 engages another of the stationary contacts 1 to 9 or 0 that happens to be energized during the next revolution of the rotary contact. When another "hot" contact in this group is again encountered, the motor will again stop, and the mechanical finger will press the button corresponding to the said "hot" contact. With each successive revolution of the rotary contact over the commutator another of the buttons will be pressed until the rotary contact has made as many revolutions as there are digits in the number to be called. If it is necessary that the push buttons of the telephone be held down for an interval of time, or that they be let up slowly, and if the buttons themselves are not equipped with means for effecting such delayed action, then the plunger 102 or the solenoid 101 may be equipped with any of the well known means for producing such retarded action.

It is also possible to embody my broad invention in apparatus that will operate a push button type of automatic telephone without using a mechanical operating finger. Two such embodiments will be described for purposes of illustration.

In Fig. 9 the ten push buttons that are required for an automatic push button-operated telephone are indicated by the reference characters B1 to B9 and B0. A solenoid is disposed immediately above each of these push buttons, these solenoids being designated as F1, F2, etc., to F9 and F0. Each of the solenoids is supplied with a plunger, these plungers being designated by the letter "P" followed by a numeral corresponding to that used in the reference character for the associated solenoids. One side of each of the solenoid coils is grounded as indicated in the figure and the other side of each coil is connected to the output side of the patch panel 180. This patch panel comprises all of the provisions of patch panels 13 and 14 of Fig. 1, including the cords and plugs whereby the contacts of deck A of the stepping switch 15 are connected to different output conductors of the patch panel 14. In order to emphasize the common features of the schematic circuit arrangement of Figs. 9 and 1, the stepping switch of Fig. 9 has been designated by the reference character 15d, and the patch panel is indicated only in block form because the details and connections have already been described in connection with the corresponding patch panels of Fig. 1.

In general, the embodiment illustrated in Fig. 9 is substantially the same as that illustrated in Fig. 1 with the exception of the fact that the dial motor, commutator and mechanical finger of the Fig. 1 arrangement have been replaced in the Fig. 9 embodiment by the ten solenoids F1 to F9 and F0 and the associated plungers. The cycle of operation of the Fig. 9 embodiment is started in precisely the same way as the embodiment schematically illustrated in Fig. 1. It is thus needless to duplicate a description of the operation of the parts of this embodiment that are identical to those of the Fig. 1 arrangement. The various contacts and conductors have been designated by the same reference numerals and characters used in Fig. 1 excepting that a lower case "d" has been added to each designation.

In the order in which the components come into play, the first modification from the Fig. 1 arrangement is the cam 3d. In the Fig. 1 embodiment cam 3 serves to start the dial motor 72, no counterpart of which is used in the Fig. 9 embodiment. Cam 3d is used solely for the purpose of advancing the rotary contacts of the stepping switch from the rest position to the first of the stationary contacts. This is effected by means of intermediate apparatus that will now be described. When cam 3d is in the angular position shown in the figure, blade 69d is held out of engagement with contact 70d by the portion of the periphery of cam 3d having the maximum radius or unbroken surface. As soon as the sequence motor 22d has been started by the action of relay R3d, in a manner precisely the same as that in the Fig. 1 embodiment, cam 3d will turn to a position in which the recess in the periphery will pass under the outer end of blade 69d, thus causing this blade 69d to move to the right into engagement with contact 70d. The circuit thus completed is as follows: From ground the current passes through blade 69d, contact 70d, conductor 181, coil 182 of solenoid 183, and conductors 184 and 27d to the current supply 28d, the other side of which is grounded, as indicated in the figure. The energizing of solenoid 183 causes plunger 185 to be drawn down. As this occurs, the projection 186, which is integral therewith, engages the outer end 187 of the rocker 188. This rocker is pivoted at 189 and is normally held in a horizontal position by the action of spring 190. The engagement of projection 186 with the outer end 187 of rocker 188 completes the circuit to the stepping magnet 79d as follows: Current proceeds from ground through conductor 193, keeper spring 194, plunger 185, projection 186, rocker 188, spring 190, conductors 191, 192 and 78d to the coil of the stepping magnet 79d and thence through conductors 81d, 204, 82d, 84d, and 27d to the current supply 28d. As projection 186 continues to move downward upon the energizing of the solenoid coil 183 it will, of course, rotate rocker 188, turning it to an angular position in which the projection 186 will pass below the rocker.

In order to make certain that the engagement of projection 186 with the outer end 187 will produce a current impulse of sufficient duration to cause the stepping magnet to advance the rotary contacts of the stepping switch to the first position, solenoid 182 may be equipped with a suitable dash-pot to retard the downward movement of the plunger 185. This dash-pot is neither shown nor described, as it is a well known mechanical arrangement which, per se, is not novel with the present inventor. Furthermore, other retarding means may alternatively be used to accomplish the same result.

The purpose of the solenoid 183 and its associated plunger and contact rocker is, as previously mentioned, merely to give the impulse that advances the rotary contacts of the stepping switch to the first stationary contact. This impulse takes place only during a momentary engagement of projection 186 with the outer end 187 of rocker 188 and the impulse does not continue during the entire time that solenoid 183 is energized. As soon as cam 3d has turned sufficiently far for the recess in the periphery of the cam to move past the outer end of blade 69d, the greater radius of the outer periphery of the cam will cause blade 69d to move away from contact 70d, thus de-energizing solenoid 183. It is important, of course, that the upward movement of plunger 185 under action of the return spring 194 not produce an additional impulse to the stepping magnet as projection 186 again moves past the outer end of the rocker during the upward movement of the plunger. To prevent such additional impulse the under side 197 of the outer end of rocker 188 is formed of insulating material. When the upper portion of projection 186 engages this insulated portion 197 there is, of course, no current flow and projection 186 moves upward past the outer end of the rocker without any impulse being produced.

At this point it may be well to explain another modification from the arrangement of Fig. 1. The segment contact 92d of deck A, instead of being connected to a coil of the latching relay such as R5 of Fig. 1, is instead connected by means of a conductor 205 to a contact 202, which in one energized position of relay R8 is in engagement with armature 201, which at that time also engages a contact 203. This contact is connected to the power supply by means of conductors 206, 82d, 84d and 27d.

The energizing of stepping magnet 79d by the engagement of projection 186 causes the rotary contacts of the stepping switch 15d to advance to the first position, thereby bringing the rotary contact 88d of deck A of the stepping switch into engagement with stationary contact C1d. This will complete a circuit to whatever output conductor of the patch panel has been connected to conductor 95d by the advance set-up on the patch panel, as fully described in connection with the species of my invention illustrated in Fig. 1. For purposes of illustration let us assume that this is conductor 195 leading from the plug 6MNO, which was the jack initially energized in the dialing of Madison 6495 as described in connection with the species of Fig. 1. Conductor 195 is connected to solenoid F6, the other side of which is grounded as shown in Fig. 9. The circuit from stepping switch thru the patch panels is identical to that described in connection with Fig. 1, but in the instant embodiment the circuit to ground is, of course, completed thru conductor 195 and solenoid F6. The energizing of this solenoid causes plunger P6 to move down against the action of the keeper spring 196 into engagement with button B6, as the operator's finger normally would do. As plunger P6 moves downward the cap Q6 engages the outer end of a rocker U6, which is identical in construction and function with rocker 188 excepting that the insulated portion on the outer end is on the top of rocker U6 instead of on the bottom as in rocker 188. As a consequence, the cap Q6 touches only the insulating material of rocker U6 during its downward stroke. When cap Q6 reaches the bottom of its stroke, it engages a contact T6. This completes a circuit that de-energizes solenoid F6 in the following described manner: Current flows from ground through conductor 198, keeper spring 196, cap Q6, contact T6 and conductor 199 to the left side of the coil of latching relay R8 and thence through conductors 200, 82d, 84d, and 27d to the current supply unit 28d. The resultant energizing of relay R8 attracts the armature 201 of this relay to the left, thus moving the armature away from contacts 202 and 203. Inasmuch as this armature and these contacts were in series with solenoid F6, due to the fact that they were in circuit between the stationary contact segment 92d and the power supply, the opening of the circuit across contacts 202 and 203 breaks the circuit to solenoid F6. The consequent de-energizing of solenoid F6 permits the plunger P6 to be pulled upward by the keeper spring 196. As the cap Q6 moves up from its operated position the upper portion of the cap energizes the under side of the outer end of rocker U6. This completes the circuit through stepping magnet 79d as well as through the coil of relay R9, the coils of these two magnets being in parallel. Their circuits may be traced as follows: From ground the current proceeds through conductor 198, keeper spring 196, cap Q6, rocker U6, spring 207 and conductors 192 and 78d to the stepping magnet 79d, from whence the current passes through conductors 81d, 204, 82d, 84d and 27d to the power supply unit 28d. The energizing of this stepping magnet, of course, advances the rotary contacts of both decks of the stepping switch to the second stationary contact in each deck. Simultaneous with the passage of the current through stepping magnet 79d, the current passes through conductor 208 from conductor 192 and thence through the coil of relay R9 and conductors 209, 206, 82d, 84d and 27d to the power supply.

The operation of relay R9 energizes the right coil of relay R8, which action in turn completes a circuit to segment 92d of deck A of the stepping switch 15d. Relay R9 completes a circuit through the right coil of latching relay R8 as follows: From ground the current passes through armature 210, contact 211, conductor 212, the right coil of relay R8 and conductors 200, 82d, 84d and 27d to the power supply. The energizing of the right coil of R8 moves armature 201 into engagement with contacts 202 and 202. This completes a circuit from segment 92d through conductor 205, contact 202, armature 201, contact 203 and conductors 213, 206, 82d, 84d and 27d to the power supply unit. When the circuit is completed from cap Q6 to rocker U6 the relay R8 is thus made to operate indirectly through the relay R9, rather than directly. Relay R9 is electrically interposed between rocker U6 and relay R8 in order to allow sufficient time for the stepping magnet 79d to advance the rotary contact 88d of the stepping switch 15d to the next succeeding stationary contact before the circuit is completed from the power supply to the stationary segment 92d. Should segment 92d be energized before the stepping magnet has advanced rotary contact 88d to stationary contact C2d, the current would pass from rotary contact 88d through stationary contact C1d and would again energize solenoid F6. The time delay effected by the interposition of relay R9 prevents this, and segment 92d is thus not energized until after the stepping magnet has advanced the rotary contact 88d to the next succeeding stationary contact. The completion of a circuit from segment 92d to stationary contact C2d results in energizing another of the solenoids that operate the push buttons, the particular solenoid thus energized depending upon the connections that have been previously set up on the patch panels. When the plunger of such solenoid reaches the lower end of its stroke the circuit through the solenoid will be broken in the manner previously explained in connection with solenoid F6 and the return of the cap of the plunger will complete the circuit through the associated rocker of that particular solenoid, thus advancing the stepping switches in the manner previously explained.

It will be obvious that sufficient time must elapse between the operation of two of the solenoids to permit the automatic switchboards of the central telephone station to respond to the operation of any given push button. Any means well known in the art may be used to effect this necessary time lag between the successive operation of two plungers. This may be accomplished by a dash-pot which will retard the upward movement of the plunger or it may be brought about by electronic or other expedients.

After the stepping switch has advanced to the last stationary contact required for the calling of the desired telephone number, it is, of course, necessary that the rotary contacts of the two banks of the stepping switch return to the rest position in order to be in readiness for another series of operations in response to the opening of the external circuit across contacts 23d and 24d. In the embodiment illustrated in Fig. 1 the dialing of the final digit in the number is followed by the completion of the circuit through relays that open the circuit to the dial motor. Such circuits are, of course, omitted from this species, and it is merely necessary that the instant apparatus embody means for returning the rotary contacts of the stepping switch to the rest position. This is effected by means of the tap switch 136d and the relay R6d, which correspond generally in function with tap switch 136 and relay R6 of the Fig. 1 species. Contact 137d of the tap switch 136d is shown on contact 6, this rotary contact having been placed on this stationary contact because there are only six letters and digits in Madison 6495, which we are here using for purposes of illustration. In the Fig. 1 embodiment, contact 137 was in circuit with the commutator. In this embodiment rotary contact 137 is connected directly to ground by means of conductor 214. From rotary contact 137d the current passes through stationary contact 6, conductor 139d, contact 6th, rotary contact 89d, conductor 143d, contact 140, segment 141d and conductor 142 to the coil 144d of relay R6d and thence through conductors 84d and 27d to the power supply unit. The circuits completed by the blades and contacts of 46d are the same as those completed by the operation of relay R6 in the species of Fig. 1 and the various components have therefore been numbered the same as in the earlier described species excepting that in the instant embodiment a lower case "d" has been added to the numerals. Suffice it to say that the energizing of relay R6d operates magnet 153d to operate the pawl 87d of the stepping switch in order to return the rotary contacts to their rest position.

After the number has been called by the operation of the solenoids and plungers in the manner described supra, cams 1d, 2d and 3d will continue to rotate for a period of time sufficient for the telephone line to be used for the intended purpose and when the cams are rotated to the angular position shown in the figure the sequence motor will be de-energized as explained in connection with the corresponding components and circuits shown in Fig. 1 and described in connection therewith.

Figs. 10, 11, 12, 13 and 14 illustrate still another embodiment of my invention. This species, like the last one described, actuates the push buttons of an automatic telephone without the use of a mechanical finger. In the instant species a single solenoid actuates all of the push buttons by means of intervening levers that are brought in and out of engagement with a driving member carried by the plunger of the said operating solenoid. These levers, which determine the button that will be operated by any given stroke of the operating solenoid, are moved in and out of engagement with the said driving member by means of ten different solenoids that are individual to the ten levers that are engaged by the said driving means. In this embodiment the buttons are arranged in a circle much the same as in the previously described embodiment in which the plungers are operated by a mechanical finger, the circuit arrangements for which were illustrated in part in Fig. 8.

Fig. 10 is a fragmentary view, partly in section, of the main operating solenoid, two of the selector levers, and other apparatus used for operating two of the push buttons B1e shown on the right and B6e shown on the left. Other buttons and levers have been omitted for the sake of clarity. Rods V6e and V1e are disposed respectively above buttons B6e and B1e and are mounted for longitudinal movement in holes or ways provided in the base member 215. Solenoid 216 is mounted in the center of the circle of levers, Fig. 10 showing this solenoid disposed intermediate the selector levers W6e and W1 e. It must be understood, of course, that there are eight other levers disposed in the circle around solenoid 216, these additional levers being arranged with respect to the solenoid in the same manner as levers W6e and W1e are arranged. Plunger 217 of solenoid 216 is held in an inoperative or rest position by keeper spring 218. The driving member 219 of circular form is centrally mounted on plunger 217 as shown in Figs. 10, 12 and 13. The selector levers are also held up in an inoperative position by means of springs. One of these springs 222 is shown attached to selector lever W6e in Figs. 10 and 13, the upper end of this spring being attached to a conducting ring 220 surrounding the upper portion of the solenoid 216. Other springs, like 222, are also attached to this ring as well as to each of the other nine selector levers. It will be noted in Fig. 10 that spring 222 not only holds selector lever W6e in an upward position but it also urges it against the solenoid-encircling ring 220. A series of 10 holes 221 is arranged in a circle in the driving disc 219 in such a way that the upper end of the selector levers are in alignment with these holes 221 as shown in Fig. 12. Surrounding the solenoid and selector lever assembly there are disposed ten magnets X1 to X9 and X0, as shown in the plan view of Fig. 12 and as indicated in elevation in Fig. 10 in which two of these magnets X1 and X6 are shown. It will be noted that magnets X1 and X6 are aligned with the projections Y1 and Y6 of selector levers W1e and W6e respectively. This aligned relationship of the cores of the magnets with the projections Y1 and Y6 is also shown in Fig. 12.

The magnets X1 to X6 are connected to the patch panel in exactly the same manner as the solenoids F1 to F9 and F0 in the species of Fig. 9. The species now being described is identical to that shown in Fig. 9 with the exception of the fact that the solenoid, magnet and lever assembly of Figs. 10, 11, 12, 13 and 14 is substituted for the solenoid assembly of the Fig. 9 species. All the electrical connections to the other components of the species are the same as shown in Fig. 9 and it is therefore unnecessary to describe them or to show them in additional figures, which would merely be repetitive.

When one of the magnets, say X1, is energized by means of a "hot" conductor from the patch panel the magnet attracts the extension on the associated selector lever. In Fig. 10 the projection Y1 on selector lever W1e has been urged to the right under action of the energized magnet X1. This pulls the selector lever W1e out of alignment with its associated hole 221 in the driving disc 219. A flexible ring 223, shown in perspective in Fig. 14 and in section in Fig. 10, surrounds the selector levers near the lower end. A conductor 224 is attached to one of the supports 225 that hold the flexible ring 223 in position. This conductor 224 is connected to conductor 205, Fig. 9, which is connected to the power supply unit through contacts 202 and 203 and armature 201 of relay R3. When one of the selector levers is moved toward its associated magnet by the action of such magnet, the lower portion of such lever engages flexible ring 223 as shown in Fig. 10 where selector lever W1e is pictured in such engaged position. Current then flows from the power supply unit through conductors 27d, 84d, 82d, 200, 206, 213, contact 203, armature 201, contact 202, conductors 205 and 224, support 225, ring 223, selector lever W1e, spring 226, ring 220, conductor 227, solenoid 216, and then to ground by means of conductor 228. The resultant current flow through the solenoid 216 of course operates the solenoid, but not until after the selector lever has been pulled out of its normal alignment with its associated hole 221. When plunger 217 draws downward in response to the action of the energized solenoid 216, the outer portion of the driving disc 219 will engage the upper end of selector lever W1e; but the upper ends of none of the other selector levers will be engaged because they will pass through their associated holes 221, as indicated in Fig. 13 where selector lever W6e is shown passing through its associated hole 221 in the driving disc. It will be noted in Fig. 13 that selector lever W1e has been pushed downward against the action of its keeper spring 226. As shown in Fig. 13, the projection Y1, of course, moves downward out of alignment with the core of its associated magnet X1. Inasmuch as this greatly reduces the flux between the magnet core and projection Y1 or any other part of the selector lever W1e, there might be a tendency of keeper spring 226 to pull the lever W1e toward the solenoid and away from magnet X1. To prevent this from happening, an annular projection or bead 230 is formed on the lower side of disc 219 as shown in Figs. 13, 10 and 12. This projection prevents the upper end of any of the levers from slipping back into alignment with its associated hole after it has initially been drawn out of such alignment by the action of its associated magnet. When any selector lever is pushed downward by the driving disc 219, its associated rod will, of course, engage the push button with which it is aligned.

In Fig. 13 rod V1e has engaged push button B1e and pushed it down to an operated position, but it will be noted that there has been no engagement between rod V6e and its associated push button B6e because selector rod W6e was not attracted by its associated magnet and therefore the upper end of the latter selector lever remained in its rest position with its associated hole 221 passing down over the lever. When the plunger has reached the downward end of its stroke, as shown in Fig. 13, the cap Qe engages contact Te connected to conductor 199e, which corresponds to conductor 199 shown in Fig. 9. This operates the latching magnet R8 in order, indirectly, to de-energize magnet X1 and solenoid 216. As plunger 217 is pulled upward by the action of the keeper spring 218, cap Q3 engages the under side of rocker Ue. This rocker is normally held in a horizontal position by means of spring 229, which is connected to conductor 192e. The latter conductor is connected to the stepping magnet 79d of Fig. 9. The action of this stepping magnet advances the rotary contacts of the stepping switch to the next stationary contact. This, in turn, completes a circuit through the patch panel 180 to another of the magnets of the X series in Fig. 12 and another selector lever is operated by means of the solenoid 216 in the manner previously described.

Inasmuch as the instant species is the same as that of Fig. 9 excepting for the substitution of the magnets and solenoids in Figs. 10, 12 and 13 for the solenoids of the Fig. 9 species, it will readily be understood that the stepping switch and other components will cause the proper push buttons of the instant species to be operated in proper sequence until the desired number has been called.

In the instant species the magnets of the X series may, of course, be small because their only function is to pull the selector levers into a position where they will be engaged by the driving disc 219. Solenoid 216 is, of course, more powerful and should, in fact, be more powerful than the solenoids of the Fig. 9 species because it must not only operate one push button at a time but must overcome the simultaneous action of two keeper springs. These are the keeper springs 218 of the plunger 217 and the keeper spring of the particular selector lever that is being operated at any given time.

The rocker Ue, as Figs. 10 and 13 indicate, is constructed the same as the rockers U6 to U9 and U0 of the Fig. 9 species. When cap Qe moves downward it therefore strikes the insulated portion of the tip of the rocker and consequently no circuit is completed from cap Qe to rocker Ue on the downward stroke.

In order to prevent plunger 217 and the driving disc 219 from pressing the telephone buttons in too rapid sequence, the solenoid 216 may be equipped with a dash-pot as explained herein in connection with other solenoids, or the necessary delaying action can be effected by any other means, either mechanical or electrical, as for instance by electronic devices that are well known for such purpose.

The foregoing specification has described only illustrated improvements of my invention and it is not my intention to be limited to any of these forms. Various substitutions may be made for any of the components, either individually or collectively, and my invention contemplates the substitution of any of the elements of the appended claims by other elements that are capable of performing the same function as that of the element omitted.

I claim:

1. In apparatus for automatically calling a preselected telephone number on a dial telephone, a combination including: a first means for engaging the regular telephone line button for switching the telephone in and out of circuit; a second means comprising a mechanical dialing finger adapted to rotate in a circle concentric with the telephone dial for rotating the same; electro-responsive means for moving said finger into any of the openings in said dial; a third means for moving said finger out of any of said openings upon the de-energizing of said electro-responsive means; commutating means comprising a different electrical contact for each of the openings in said dial; a conducting brush adapted successively to move over and engage said contacts; means whereby the movement of said brush is synchronized with the movement of said finger so that said brush will engage each contact while said finger is in registry with the corresponding opening in said dial; means for pre-selecting which of said contacts will be energized during specific cycles of movement of said brush; and means for energizing said electro-responsive means upon completion of a circuit between any of said contacts and said brush so that said finger during specific cycles of its rotation will move into the dial opening corresponding to the contact that is energized during the corresponding cycle of movement of said brush.

2. In apparatus for automatically calling a preselected telephone number on a dial telephone, a combination including: a first means for engaging the regular telephone line button for switching the telephone in and out of circuit; a second means comprising a mechanical dialing finger adapted to rotate in a clockwise direction only, and to describe a circle concentric with the telephone dial; electro-responsive means for moving said finger into any of the openings in said dial; a third means for moving said finger out of any of said openings upon the de-energizing of said electro-responsive means; commutating means comprising a different electrical contact for each of the openings in said dial; a conducting brush adapted successively to traverse said contacts; means whereby the movement of said brush is synchronized with the movement of said finger so that said brush will engage each of said contacts while said finger is directly over the corresponding opening in said dial; a step switch having a plurality of stationary contacts and a wiping contact for engaging said stationary contacts; manual means for connecting said stationary contacts selectively to any of the aforementioned contacts of said commutating means; and means for energizing said electro-responsive means upon completion of a circuit between any of said commutator contacts and said brush so that said finger during specific cycles of its rotation will move into the dial opening corresponding to the commutator contact that is then energized by said step switch.

3. In apparatus for automatically calling a preselected telephone number on a dial telephone, a combination including; a first means for engaging the regular telephone line button for switching the telephone in and out of circuit; a second means comprising a mechanical dialing finger adapted to rotate in a clockwise direction only, and to describe a circle concentric with the telephone dial; electro-responsive means for moving said finger into any of the openings in said dial; a third means for moving said finger out of any of said openings upon the de-energizing of said electro-responsive means; commutating means comprising at least as many electrical contacts as there are finger openings in said dial; a conducting brush adapted successively to traverse said contacts; means whereby the movement of said brush is synchronized with the movement of said finger so that said brush will engage each of said contacts while said finger is directly over a different opening in said dial; a step switch having a plurality of stationary contacts and a wiping contact for engaging said stationary contacts; means for successively advancing said wiping contact from one of said stationary contacts to the next each time said finger has completed a revolution; manually operable means for connecting said stationary contacts selectively to any one of the aforementioned contacts of said commutating means; and means for energizing said electro-responsive means upon completion of a circuit between any of said commutator contacts and said brush so that said finger during specific cycles of its rotation will move into the dial opening associated with the commutator contact that is then energized by the wiping contact of said step switch.

4. In apparatus for automatically calling a preselected telephone number on a dial telephone, a combination including: a first means for engaging the regular telephone line button for switching the telephone in and out of circuit; a second means comprising a mechanical dialing finger adapted to rotate in a clockwise direction only, and to describe a circle concentric with the telephone dial; electro-responsive means for moving said finger into any of the openings in said dial; a third means for moving said finger out of any of said openings upon the de-energizing of said electro-responsive means; commutating means comprising a different electrical contact for each of the openings in said dial and at least one more electrical contact; a conducting brush adapted successively to traverse said contacts; means whereby the movement of said brush is synchronized with the movement of said finger so that said brush will engage all but one of said contacts while said finger is directly over a different opening in said dial; a step switch having a plurality of stationary contacts and a wiping contact for successively engaging and energizing said stationary contacts; manually operable means for connecting said stationary contacts selectively to all but one of the aforementioned contacts of said commutating means; means for energizing said electro-responsive means upon the engagement of said brush with the particular commutator contact that is then connected to the stationary contact then being engaged by said wiping contact; and means for de-energizing said electro-responsive means when said conducting brush is in engagement with a contact of said commutator that is not associated with an opening in said dial.

5. In apparatus for use with an automatic telephone having a plurality of finger-actuatable means each specific to one of the digits from 1 to 9 and 0, a combination including: electro-responsive means for selectively engaging and operating said finger-actuatable means; selectively energizable means each specific to one of said finger-actuatable means and each acting when electrically energized to cause the finger actuatable means that is specific thereto to be engaged and operated by said electro-responsive means; a step switch having a plurality of stationary contacts and a wiping contact for engaging said stationary contacts; manually operable means for connecting each of said stationary contacts selectively to any one of said selectively energizable means; and means for successively advancing said wiping contact from one of said stationary contacts to the next after each successive operation of said electro-responsive means.

6. In apparatus for use with an automatic telephone having a plurality of finger-actuatable means each specific to one of the digits from 1 to 9 and 0, a combination including: electro-responsive means for selectively engaging and operating said finger-actuatable means; selectively energizable means each specific to one of said finger-actuatable means and each acting when electrically energized to cause the finger-actuatable means that is specific thereto to be engaged and operated by said electro-responsive means; a step switch having a plurality of stationary contacts and a wiping contact for engaging said stationary contacts, manually operable means for connecting each of said stationary contacts selectively to any one of said selectively energizable means; means for successively advancing said wiping contact from one of said stationary contacts to the next after each successive operation of said electro-responsive means; and means for returning said wiping contact to a rest position out of engagement with any of said stationary contacts after a predetermined number of operations of said electro-responsive means.

7. In apparatus for use with an automatic telephone having a plurality of finger-actuatable means each specific to one of the digits from 1 to 9 and 0, a combination including: electro-responsive means for selectively engaging and operating said finger-actuatable means; selectively energizable means each specific to one of said finger-actuatable means and each acting when electrically energized to cause the finger-actuatable means that is specific thereto to be engaged and operated by said electro-responsive means; a step switch comprising first and second decks each having a plurality of stationary contacts and a wiping contact for engaging said stationary contacts; manually operable means for connecting each of the stationary contacts of the first deck to any one of said selectively energizable means; means including a stepping magnet for successively advancing the wiping contacts of both decks from one stationary contact to the next after each successive operation of said electro-responsive means; electro-magnetic means for returning the wiping contacts to a rest position out of engagement with any of said stationary contacts; and manually operable means for selectively connecting certain stationary contacts of said second deck to said electro-magnetic means so that a circuit may be completed to said electro-magnetic means when the wiping contact of said second deck makes engagement with the particular stationary contact of said second deck that has been connected to said electro-magnetic means.

8. In apparatus for use with an automatic telephone having a plurality of finger-actuatable means each specific to one of the digits from 1 to 9 and 0, a combination including: a first means engageable with the telephone line button for switching the telephone in and out of circuit; electro-responsive means for selectively engaging and operating said finger-actuatable means; selectively energizable means each specific to one of said finger-actuatable means and each acting when electrically energized to cause the finger-actuatable means that is specific thereto to be engaged and operated by said electro-responsive means; a step switch having a plurality of stationary contacts and a wiping contact for engaging said stationary contacts; manually operable means for connecting each of said stationary contacts selectively to any one of said selectively energizable means; means including a stepping magnet for successively advancing said wiping contact from one of said stationary contacts to the next after each successive operation of said electro-responsive means; rotary means acting to supply an initial electrical impulse to said stepping magnet; a motor for operating said rotary means; and a relay acting (1) to cause said first means to switch the telephone in circuit and (2) to energize said motor.

9. In apparatus for use with an automatic telephone having a plurality of finger-actuatable means each specific to one of the digits from 1 to 9 and 0, a combination including: a first means engageable with the telephone line button for switching the telephone in and out of circuit; electro-responsive means for selectively engaging and operating said finger-actuatable means; selectively energizable means each specific to one of said finger-actuatable means and each acting when electrically energized to cause the finger-actuatable means that is specific thereto to be engaged and operated by said electro-responsive means; a step switch having a plurality of stationary contacts and a wiping contact for engaging said stationary contacts; manually operable means for connecting each of said stationary contacts selectively to any one of said selectively energizable means; means including a stepping magnet for successively advancing said wiping contact from one of said stationary contacts to the next after each successive operation of said electro-responsive means; means for returning said wiping contact to a rest position out of engagement with any of said stationary contacts after a predetermined number of operations of said electro-responsive means; rotary means acting to supply an initial electrical impulse to said stepping magnet; a motor for operating said rotary means; and a relay acting (1) to cause said first means to switch the telephone in circuit and (2) to energize said motor.

10. In apparatus for use with an automatic telephone having a plurality of finger-actuatable means each specific to one of the digits from 1 to 9 and 0, a combination including: a first means engageable with the telephone line button for switching the telephone in and out of circuit; electro-responsive means for selectively engaging and operating said finger-actuating means; selectively energizable means each specific to one of said finger-actuatable means and each acting when electrically energized to cause the finger-actuatable means that is specific thereto to be engaged and operated by said electro-responsive means; a step switch comprising first and second decks each having a plurality of stationary contacts and a wiping contact for engaging said stationary contacts; manually operable means for connecting each of the stationary contacts of the first deck to any one of said selectively energizable means; means including a stepping magnet for successively advancing the wiping contacts of both decks from one stationary contact to the next after each successive operation of said electro-responsive means; electro-magnetic means for returning the wiping contacts to a rest position out of engagement with any of said stationary contacts; manually operable means for selectively connecting certain stationary contacts of said second deck to said electro-magnetic means so that a circuit may be completed to said electro-magnetic means when the wiping contact of said second deck engages the particular stationary contact of said second deck that has been connected to said electro-magnetic means; rotary means acting to supply an initial electrical impulse to said stepping magnet; a motor for operating said rotary means; and a relay acting (1) to cause said first means to switch the telephone in circuit and (2) to energize said motor.

11. In apparatus for use with a telephone on which telephone numbers may be called by depressing a plurality of push buttons in proper sequence, a combination including: a plurality of solenoids each individual to one of said push buttons, each of said solenoids having a plunger adjacent to and aligned with one of said buttons; a step switch having a plurality of stationary contacts and a wiping contact for engaging said stationary contacts; manually operable means for connecting each of said stationary contacts selectively to any of said solenoids; and means for successively advancing said wiping contact from one of said stationary contacts to the next after each operation of any of said solenoids.

12. In apparatus for use with a telephone on which telephone numbers may be called by depressing a plurality of push buttons in proper sequence, a combination including: a plurality of solenoids each individual to one of said push buttons, each of said solenoids having a plunger adjacent to and aligned with one of said buttons; a step switch having a plurality of stationary contacts and a wiping contact for engaging said stationary contacts; manually operable means for connecting each of said stationary contacts selectively to any of said solenoids; means for successively advancing said wiping contact from one of said stationary contacts to the next after each operation of any of said solenoids; and means for returning said wiping contact to a rest position out of engagement with any of said stationary contacts after a predetermined number of operations of said electro-responsive means.

13. In apparatus for use with a telephone on which telephone numbers may be called by depressing a plurality of push buttons in proper sequence, a combination including: a plurality of solenoids each individual to one of said push buttons, each of said solenoids having a plunger adjacent to and aligned with one of said buttons; a step switch comprising first and second decks each having a plurality of stationary contacts and a wiping contact for engaging said stationary contacts; manually operable means for connecting each of the stationary contacts of the first deck to any of said solenoids; means including a stepping magnet for successively advancing the wiping contacts of both decks from one stationary contact to the next after each successive operation of any of said solenoids; electro-magnetic means for returning the wiping contacts to a rest position out of engagement with any of said stationary contacts; and manually operable means for selectively connecting certain stationary contacts of said second deck to said electro-magnetic means so that a circuit may be completed to said electro-magnetic means when the wiping contact of said second deck makes engagement with the particular stationary contact of said second deck that has been connected to said electro-magnetic means.

14. In apparatus for use with a telephone on which telephone numbers may be called by depressing a plurality of push buttons in proper sequence, a combination including: a first means engageable with the telephone line button for switching the telephone in and out of circuit; a plurality of solenoids each individual to one of said push buttons, each of said solenoids having a plunger adjacent to and aligned with one of said buttons; a step switch having a plurality of stationary contacts and a wiping contact for engaging said stationary contacts; manually operable means for connecting each of said stationary contacts selectively to any of said solenoids; means including a stepping magnet for successively advancing said wiping contact from one of said stationary contacts to the next after each operation of any of said solenoids; rotary means acting to supply an initial electrical impulse to said stepping magnet; a motor for operating said rotary means; and a relay acting (1) to cause said first means to switch the telephone in circuit and (2) to energize said motor.

15. In apparatus for use with a telephone on which telephone numbers may be called by depressing a plurality of push buttons in proper sequence, a combination including: a first means engageable with the telephone line button for switching the telephone in and out of circuit; a plurality of solenoids each individual to one of said push buttons, each of said solenoids having a plunger adjacent to and aligned with one of said buttons; a step switch having a plurality of stationary contacts and a wiping contact for engaging said stationary contacts; manually operable means for connecting each of said stationary contacts selectively to any of said solenoids; means including a stepping magnet for successively advancing said wiping contact from one of said stationary contacts to the next after each operation of any of said solenoids; means for returning said wiping contact to a rest position out of engagement with any of said stationary contacts after a predetermined number of operations of said solenoids; rotary means acting to supply an initial electrical impulse to said stepping magnet; a motor for operating said rotary means; and a relay acting (1) to cause said first means to switch the telephone in circuit and (2) to energize said motor.

16. In apparatus for use with a telephone on which telephone numbers may be called by depressing a plurality of push buttons in proper sequence; a combination including: a first means engageable with the telephone line button for switching the telephone in and out of circuit; a plurality of solenoids each individual to one of said push buttons, each of said solenoids having a plunger adjacent to and aligned with one of said buttons; a step switch comprising first and second decks each having a plurality of stationary contacts and a wiping contact for engaging said stationary contacts; manually operable means for selectively connecting each of the stationary contacts of the first deck to any of said solenoids; means including a stepping magnet for successively advancing said wiping contacts from one of said stationary contacts to the next after each operation of any of said solenoids; electro-magnetic means for returning the wiping contacts to a rest position out of engagement with any of said stationary contacts; manually operable means for selectively connecting certain stationary contacts of said second deck to said electro-magnetic means so that a circuit may be completed to said electro-magnetic means when the wiping contact of said second deck engages the particular stationary contact of said second deck that has been connected to said electro-magnetic means; rotary means acting to supply an initial electrical impulse to said stepping magnet; a motor for operating said rotary means; and a relay acting (1) to cause said first means to switch the telephone in circuit and (2) to energize said motor.

17. In apparatus for automatically calling a pre-selected telephone number on a dial telephone, a combination including: a first means for engaging the regular telephone line button for switching the telephone in and out of circuit; a second means comprising a mechanical dialing finger mounted so that it may be rotated in a circle concentric with the telephone dial for rotating the same; electro-responsive means for moving said finger into any of the openings in said dial; a third means for moving said finger out of any of said openings upon the de-energizing of said electro-responsive means; commutating means comprising a different electrical contact for each of the openings in said dial; a conducting brush adapted successively to traverse said contacts; means whereby the movement of said brush is synchronized with the movement of said finger so that said brush will engage each of said contacts while said finger is directly over the corresponding opening in said dial; a step switch having a plurality of stationary contacts and a wiping contact for engaging said stationary contacts; manual means for connecting said stationary contacts selectively to any of the aforementioned contacts of said commutating means; means comprising a first motor for rotating said finger and brush; rotary means for closing and opening the circuit to said first motor; a second motor for operating said rotary means; a relay acting (1) to cause said first means to switch the telephone in circuit and (2) to energize said first motor; and means for energizing said electro-responsive means upon completion of a circuit between any of said commutator contacts and said brush so that said finger during specific cycles of its rotation will move into the dial opening corresponding to the commutator contact that is then energized by said step switch.

18. In apparatus for automatically calling a pre-selected telephone number on a dial telephone, a combination including: a first means for engaging the regular telephone line button for switching the telephone in and out of circuit; a second means comprising a mechanical dialing finger mounted so that it may be rotated in a circle concentric with the telephone dial for rotating the same; electro-responsive means for moving said finger into any of the openings in said dial; a third means for moving said finger out of any of said openings upon the de-energizing of said electro-responsive means; commutating means comprising at least as many electrical contacts as there are finger openings in said dial; a conducting brush adapted successively to traverse said contacts; means whereby the movement of said brush is synchronized with the movement of said finger so that said brush will engage each of said contacts while said finger is directly over a different opening in said dial; a step switch having a plurality of stationary contacts and a wiping contact for engaging said stationary contacts; means for successively advancing said wiping contact from one of said stationary contacts to the next each time said finger has completed a revolution; manual means for connecting said stationary contacts selectively to any of the aforementioned contacts of said commutating means; means comprising a first motor for rotating said finger and brush; rotary means for closing and opening the circuit to said first motor; a second motor for operating said rotary means; a relay acting (1) to cause said first means to switch the telephone in circuit and (2) to energize said first motor; and means for energizing said electro-responsive means upon completion of a circuit between any of said commutator contacts and said brush so that said finger during specific cycles of its rotation will move into the dial opening corresponding to the commutator contact that is then energized by said step switch.

19. In apparatus for automatically calling a pre-selected telephone number on a dial telephone, a combination including: a first means for engaging the regular telephone line button for switching the telephone in and out of circuit; a second means comprising a mechanical dialing finger mounted so that it may be rotated in a circle concentric with the telephone dial for rotating the same; electro-responsive means for moving said finger into any of the openings in said dial; a third means for moving said finger out of any of said openings upon the de-energizing of said electro-responsive means; commutating means comprising a different electrical contact for each of the openings in said dial and at least one more electrical contact; a conducting brush adapted successively to traverse said contacts; means whereby the movement of said brush is synchronized with the movement of said finger so that said brush will engage all but one of said contacts while said finger is directly over a different opening in said dial; a step switch having a plurality of stationary contacts and a wiping contact for successively engaging and energizing said stationary contacts; manually operable means for connecting said stationary contacts selectively to all but one of the aforementioned contacts of said commutating means; means comprising a first motor for rotating said finger and brush; rotary means for closing and opening the circuit to said first motor; a second motor for operating said rotary means; a relay acting (1) to cause said first means to switch the telephone in circuit and (2) to energize said first motor; means for energizing said electro-responsive means upon the engagement of said brush with the particular commutator contact that is then connected to the stationary contact then being engaged by said wiping contact; and means for de-energizing said electro-responsive means when said conducting brush is in engagement with a contact of said commutator that is not associated with an opening in said dial.

20. In apparatus for automatically operating the push buttons of a telephone on which telephone numbers may be called by depressing a plurality of circularly arranged buttons in proper sequence, a combination including: means comprising a mechanical dialing finger adapted to rotate above said buttons in a circle concentric with the circle in which said buttons are arranged; electro-responsive means for moving said finger downward; means for energizing said electro-responsive means at predetermined times and for predetermined intervals during specific cycles of rotation of said finger in order to cause said finger to move downward when in registry with the particular button that is to be operated during each specific cycle; and means for raising said finger from engagement with any of said buttons when said electro-responsive means is de-energized.

MICHAEL E. THORNTON.

REFERENCES CITED

The following references are of record in the file of this patent:

UNITED STATES PATENTS

| Number | Name | Date |
|---|---|---|
| 1,870,547 | Wise | Aug. 9, 1932 |
| 1,882,106 | Wise | Oct. 11, 1932 |
| 1,895,552 | Myers | Jan. 31, 1933 |
| 1,927,413 | Morin | Sept. 19, 1933 |
| 2,410,833 | Mecham | Nov. 12, 1946 |